US012271134B2

(12) United States Patent
Kato et al.

(10) Patent No.: US 12,271,134 B2
(45) Date of Patent: Apr. 8, 2025

(54) IMAGE FORMING APPARATUS CONFIGURED TO CONTROL OUTPUT OF HEATER DEPENDING ON NIPPING PRESSURE AT NIPPING REGION

(71) Applicant: Brother Kogyo Kabushiki Kaisha, Nagoya (JP)

(72) Inventors: Yasutada Kato, Nagoya (JP); Yuichi Ikeno, Maibara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/337,640

(22) Filed: Jun. 20, 2023

(65) Prior Publication Data

US 2024/0004334 A1 Jan. 4, 2024

(30) Foreign Application Priority Data

Jun. 29, 2022 (JP) ................................ 2022-104693

(51) Int. Cl.
*G03G 15/20* (2006.01)

(52) U.S. Cl.
CPC ..... *G03G 15/2064* (2013.01); *G03G 15/2039* (2013.01); *G03G 15/2053* (2013.01); *G03G 2215/2038* (2013.01)

(58) Field of Classification Search
CPC ........... G03G 15/2039; G03G 15/2042; G03G 15/2046; G03G 15/205; G03G 15/2053; G03G 15/2064
See application file for complete search history.

(56) References Cited

U.S. PATENT DOCUMENTS

| | | | | |
|---|---|---|---|---|
| 2009/0297236 | A1 | 12/2009 | Saito et al. | |
| 2012/0121284 | A1 | 5/2012 | Iwasaki | |
| 2018/0017907 | A1* | 1/2018 | Miyamoto ......... | G03G 15/5029 |
| 2019/0265620 | A1 | 8/2019 | Kadowaki et al. | |
| 2020/0033767 | A1* | 1/2020 | Adachi .............. | G03G 15/2064 |
| 2020/0192256 | A1* | 6/2020 | Koyama ............ | G03G 15/2039 |
| 2020/0195806 | A1* | 6/2020 | Fukuda .............. | G03G 15/2032 |
| 2022/0269202 | A1* | 8/2022 | Gon ................... | G03G 15/2064 |

FOREIGN PATENT DOCUMENTS

| | | | |
|---|---|---|---|
| JP | 2005-321511 | A | 11/2005 |
| JP | 2010-164930 | A | 7/2010 |
| JP | 2012-103526 | A | 5/2012 |
| JP | 2019-148743 | A | 9/2019 |

* cited by examiner

*Primary Examiner* — Carla J Therrien
(74) *Attorney, Agent, or Firm* — KENEALY VAIDYA LLP

(57) ABSTRACT

An image forming apparatus includes: a heater; an endless belt; a rotary body configured to form a nipping region in cooperation with the heater; a nipping pressure changing mechanism configured to change a nipping pressure at the nipping region between a first nipping pressure and a second nipping pressure higher than the first nipping pressure; and a controller configured to perform a control process including: determining whether the nipping pressure is the first nipping pressure or the second nipping pressure; and controlling, when determining that the nipping pressure is the first nipping pressure, an output of the heater within a range that does not exceed an upper limit for the output of the heater when the nipping pressure is the first nipping pressure that is smaller than an upper limit for the output of the heater when the nipping pressure is the second nipping pressure.

15 Claims, 9 Drawing Sheets

FIG. 7A

FIRST TABLE

| DEVIATION ΔT (°C) | DUTY CYCLE (%) |
|---|---|
| $\Delta T < T1$ | 0 |
| $T1 \leqq \Delta T < T2$ | 25 |
| $T2 \leqq \Delta T < T3$ | 33 |
| $T3 \leqq \Delta T < T4$ | 42 |
| $T4 \leqq \Delta T < T5$ | 57 |
| $T5 \leqq \Delta T < T6$ | 66 |
| $T6 \leqq \Delta T < T7$ | 75 |
| $T7 \leqq \Delta T$ | 100 |

FIG. 7B

SECOND TABLE

| DEVIATION ΔT (°C) | DUTY CYCLE (%) |
|---|---|
| $\Delta T < T1$ | 0 |
| $T1 \leqq \Delta T < T2$ | 25 |
| $T2 \leqq \Delta T < T3$ | 33 |
| $T3 \leqq \Delta T < T4$ | 42 |
| $T4 \leqq \Delta T$ | 57 |

FIG. 9A

THIRD TABLE

| MANIPULATED VARIABLE U | DUTY CYCLE (%) |
|---|---|
| U<U1 | 0 |
| U1≦U<U2 | 25 |
| U2≦U<U3 | 33 |
| U3≦U<U4 | 42 |
| U4≦U<U5 | 57 |
| U5≦U<U6 | 66 |
| U6≦U<U7 | 75 |
| U7≦U | 100 |

FIG. 9B

FOURTH TABLE

| MANIPULATED VARIABLE U | DUTY CYCLE (%) |
|---|---|
| U<U1 | 0 |
| U1≦U<U2 | 25 |
| U2≦U<U3 | 33 |
| U3≦U<U4 | 42 |
| U4≦U | 57 |

IMAGE FORMING APPARATUS CONFIGURED TO CONTROL OUTPUT OF HEATER DEPENDING ON NIPPING PRESSURE AT NIPPING REGION

REFERENCE TO RELATED APPLICATIONS

This application claims priority from Japanese Patent Application No. 2022-104693 filed on Jun. 29, 2022. The entire content of the priority application is incorporated herein by reference.

BACKGROUND ART

There has been conventionally known an image forming apparatus including a heater, a belt, a pressure roller configured to nip the belt in cooperation with the heater to form a nipping region, and a pressure detection switch for detecting that a pressure is applied to the belt and the pressure roller. In such an image forming apparatus, when a pressure is applied to the belt and the pressure roller, the pressure detection switch is turned ON to enable power supply to the heater. On the other hand, when the pressure is not applied to the belt and the pressure roller, the pressure detection switch is turned OFF to cause power supply to the heater to be interrupted.

DESCRIPTION

Since power supply to the heater is interrupted when a nipping pressure at the nipping region is low in the above configuration, an image cannot be fixed to a sheet in a state where the nipping pressure is low. In a case where the conventional image forming apparatus is configured such that power supply is performed even in a state where the nipping pressure is low, there is a possibility that heat is not properly transferred from the heater to the belt and the pressure roller, which may result in heat accumulation in the heater to cause excessive temperature rise of the heater.

In view of the foregoing, it is an object of the present disclosure to provide an image forming apparatus that can suppress excessive rise in the temperature of a heater caused by power supply to the heater when a nipping pressure is low.

In order to attain the above and other object, the present disclosure provides an image forming apparatus including: a heater; an endless belt; a rotary body; a nipping pressure changing mechanism; and a controller. The heater includes: a substrate; and one or more heating elements. The endless belt is circularly movable around the heater. The rotary body is configured to nip, in cooperation with the heater, the belt therebetween to form a nipping region. The nipping pressure changing mechanism is configured to change a nipping pressure at the nipping region between: a first nipping pressure; and a second nipping pressure that is higher than the first nipping pressure. The controller is configured to perform a control process to control output of the heater. The control process includes: determining whether the nipping pressure is the first nipping pressure or the second nipping pressure; and controlling, when determining that the nipping pressure is the first nipping pressure, the output of the heater within a range that does not exceed a first output upper limit that is an upper limit for the output of the heater when the nipping pressure is the first nipping pressure. The first output upper limit is smaller than a second output upper limit that is an upper limit for the output of the heater when the nipping pressure is the second nipping pressure.

In the above configuration, when the nipping pressure is low, the output of the heater is restricted to a value that does not exceed the first output upper limit. Accordingly, excessive rise in the temperature of the heater caused by power supply to the heater when the nipping pressure is low can be suppressed.

According to another aspect, the present disclosure also provides an image forming apparatus including: a heater; an endless belt; a rotary body; and a controller. The heater includes: a substrate; and a plurality of heating elements. The heating elements are provided on the substrate and are arranged in a conveying direction of a sheet. The heating elements includes: a first heating element; and a second heating element. The first heating element is positioned most upstream among the heating elements in the conveying direction. The first heating element has a most upstream end in the conveying direction. The second heating element is positioned most downstream among the heating elements in the conveying direction. The second heating element has a most downstream end in the conveying direction. The endless belt is circularly movable around the heater. The rotary body is configured to nip, in cooperation with the heater, the belt therebetween to form a nipping region. The nipping region has a length in the conveying direction that can be changed between: a first length that is shorter than a distance in the conveying direction between the most upstream end and the most downstream end; and a second length that is longer than the distance in the conveying direction between the most upstream end and the most downstream end. The controller is configured to perform a control process to control output of the heater. The control process includes: controlling, when the length in the conveying direction of the nipping region is the first length, the output of the heater within a range that does not exceed a first output upper limit that is an upper limit for the output of the heater when the length in the conveying direction of the nipping region is the first length. The first output upper limit is smaller than a second output upper limit that is an upper limit for the output of the heater when the length in the conveying direction of the nipping region is the second length.

In the above configuration, the controller restricts the output of the heater to a value that does not exceed the first output upper limit when the length in the conveying direction of the nipping region is short. This operation can suppress excessive rise in the temperature of the heater caused by power supply to the heater when the length in the conveying direction of the nipping region is short.

FIG. 7A is a view illustrating a first table.

FIG. 7B is a view illustrating a second table.

FIG. 9A is a view illustrating a third table.

FIG. 9B is a view illustrating a fourth table.

EMBODIMENT

Hereinafter, one embodiment of the present disclosure will be described while referring to the accompanying drawings.

Figure 1:
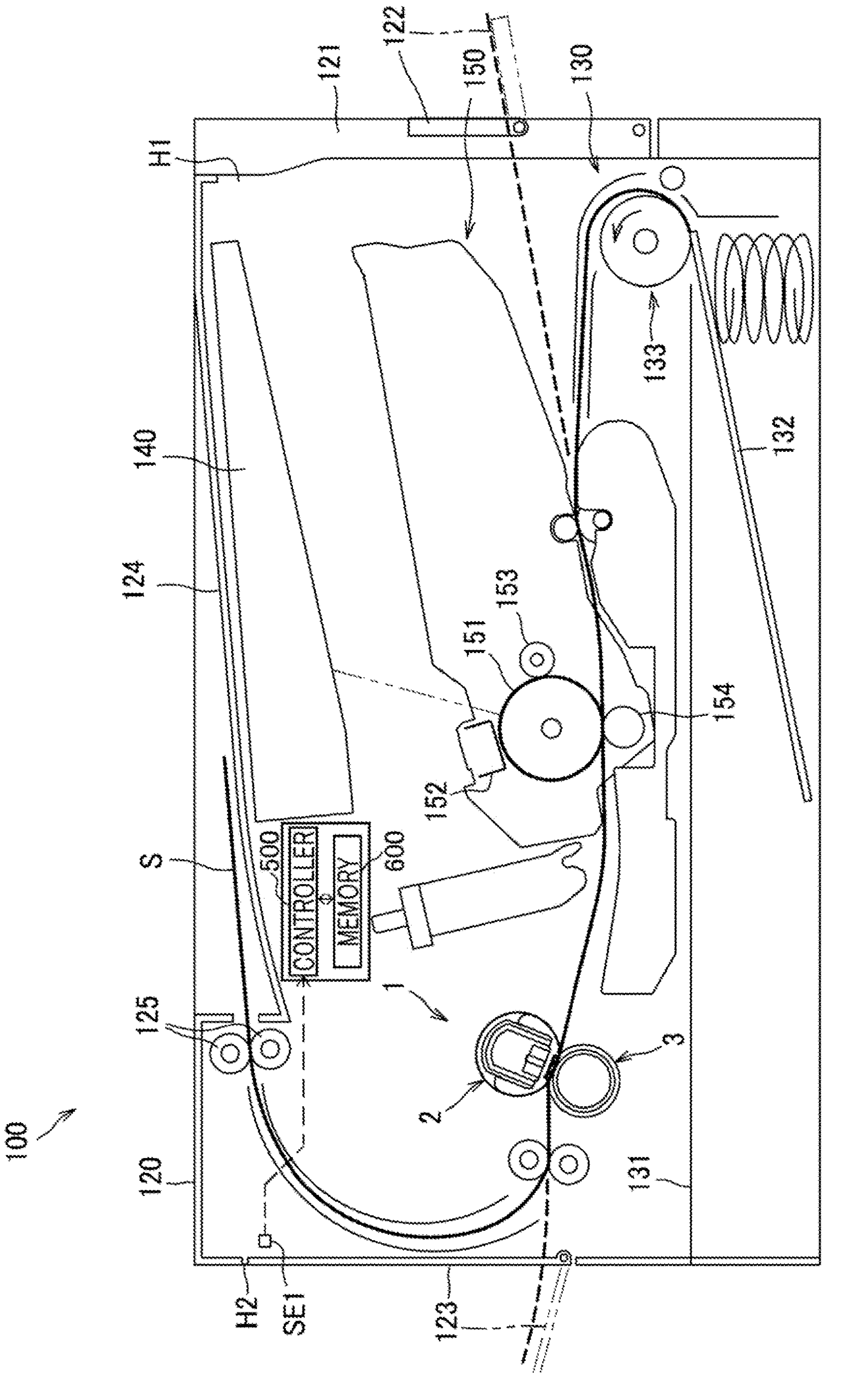
FIG. 1 is a schematic view illustrating a configuration of a laser printer.

As illustrated in FIG. 1, a laser printer 100 as an example of the image forming apparatus includes a main casing 120, a feeding unit 130, an exposure unit 140, a process cartridge 150, a fixing device 1, a controller 500, and a memory 600.

The main casing 120 has a first opening H1 and a second opening H2 (an example of the opening), and includes a front cover 121 configured to open and close the first opening H1, a manual feed tray 122, a rear cover 123 (an example of the cover) configured to open and close the second opening H2, and a discharge tray 124. The first opening H1 is an opening allowing the process cartridge 150 to pass therethrough. The manual feed tray 122 is a tray used when a sheet S (for example, a thick sheet such as a post card) is conveyed along a linear conveying path and printing is performed thereon. In the following description, printing performed along the linear conveying path will also be referred to as "straight printing".

The second opening H2 is an opening through which the sheet S discharged from the fixing device 1 passes during the straight printing. The rear cover 123 is opened when the straight printing is performed to support the sheet S discharged through the second opening H2. The discharge tray 124 is a tray for supporting the sheet S discharged out of the main casing 120 in a state where the rear cover 123 is closed.

The laser printer 100 further includes a cover sensor SE1 (an example of the sensor) configured to detect whether the rear cover 123 closes the second opening H2. Information detected by the cover sensor SE1 is outputted to the controller 500.

The feeding unit 130 is a mechanism for feeding the sheet S toward a photosensitive drum 151 (described later). The feeding unit 130 includes a sheet tray 131, a lifter plate 132, and a feeding mechanism 133. The sheet tray 131 is configured to accommodate the sheet(s) therein. The sheets S accommodated in the sheet tray 131 are lifted upward by the lifter plate 132, and are separated one by one by the feeding mechanism 133 to be fed toward the process cartridge 150.

The exposure unit 140 includes a laser light source, a polygon mirror, lenses, and a reflecting mirror those are not illustrated. The exposure unit 140 is configured to emit a laser beam on the basis of image data from the laser light source to expose a circumferential surface of the photosensitive drum 151 to light.

The process cartridge 150 is attachable to and detachable from the main casing 120 through the first opening H1. The process cartridge 150 includes the photosensitive drum 151, a charger 152, a developing roller 153, and a transfer roller 154.

The charger 152 is configured to charge the circumferential surface of the photosensitive drum 151. The exposure unit 140 is configured to expose the circumferential surface of the photosensitive drum 151 charged by the charger 152 to form an electrostatic latent image on the circumferential surface of the photosensitive drum 151.

The developing roller 153 is configured to supply toner in the process cartridge 150 to the electrostatic latent image formed on the circumferential surface of the photosensitive drum 151. Through this process, a toner image is formed on the circumferential surface of the photosensitive drum 151. Thereafter, a sheet S fed from the feeding unit 130 passes between the photosensitive drum 151 and the transfer roller 154, whereby the toner image on the circumferential surface of the photosensitive drum 151 is transferred onto the sheet S.

The fixing device 1 is configured to fix the toner image to the sheet S. The sheet S having the toner image fixed thereto is discharged onto the discharge tray 124 by a pair of discharge rollers 125.

Figure 2A:
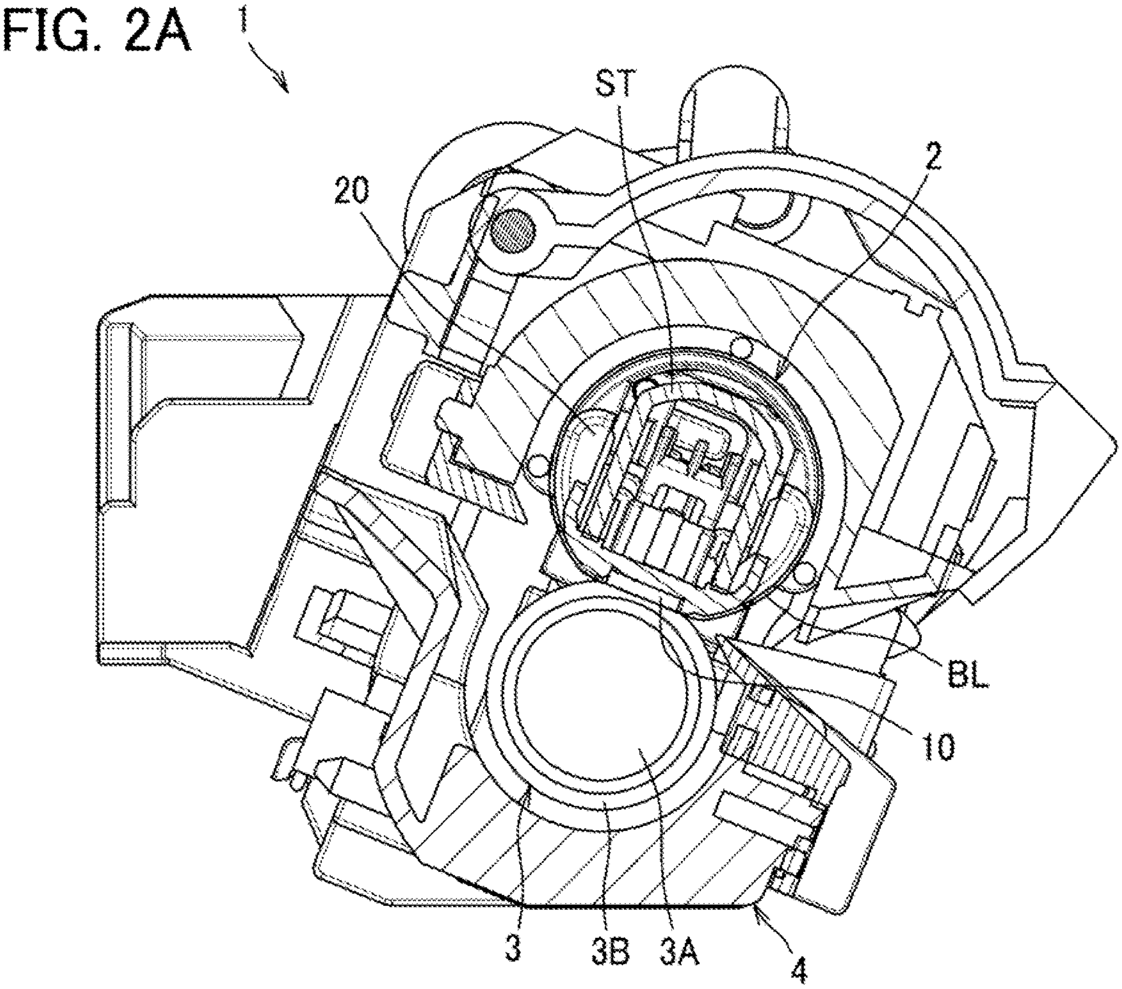
FIG. 2A is a cross-sectional view of a fixing device.

As illustrated in FIG. 2A, the fixing device 1 includes a heating unit 2, a pressure roller 3 as an example of the rotary body, and a frame 4.

The pressure roller 3 is a rotatable roller. The pressure roller 3 includes a solid cylindrical shaft 3A, and a hollow cylindrical roller portion 3B. The shaft 3A is made of metal, for example. The roller portion 3B is made of rubber, for example. The roller portion 3B covers a part of the shaft 3A.

Figure 2B:
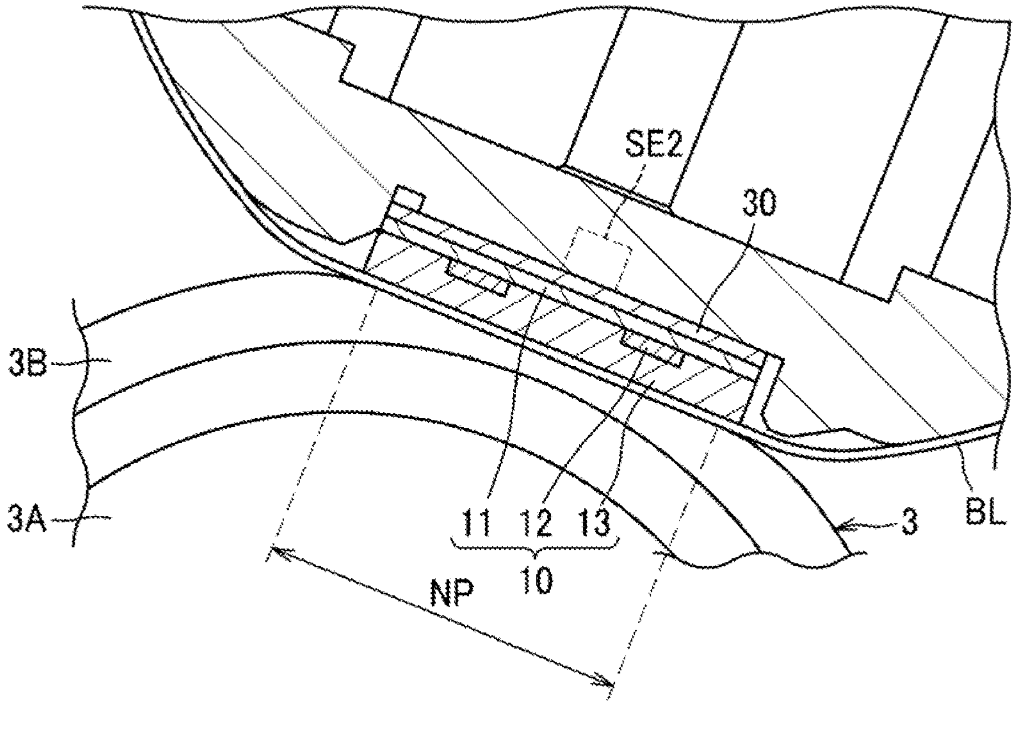
FIG. 2B is a partially enlarged cross-sectional view of a portion in the vicinity of a heater.

As illustrated in FIGS. 2A and 2B, the heating unit 2 includes a heater 10, a holder 20, a heat conductive member 30, a stay ST, a belt BL, and a temperature sensor SE2. The heater 10 is configured to heat the belt BL to heat the sheet S through the belt BL. The temperature sensor SE2 is configured to detect a temperature of the heater 10 and to output the detected temperature to the controller 500. The temperature sensor SE2 is in contact with the heat conductive member 30.

As illustrated in FIG. 2B, the pressure roller 3 is configured to nip, in cooperation with the heater 10, the belt BL therebetween to form a nipping region NP. The heater 10 includes a substrate 11, heating resistors 12 (an example of the heating element) provided on the substrate 11, and a cover 13. The substrate 11 is an elongated rectangular plate made of ceramic material such as aluminum oxide. The heater 10 is a so-called ceramic heater.

Figures 3A, 3B, 3C:
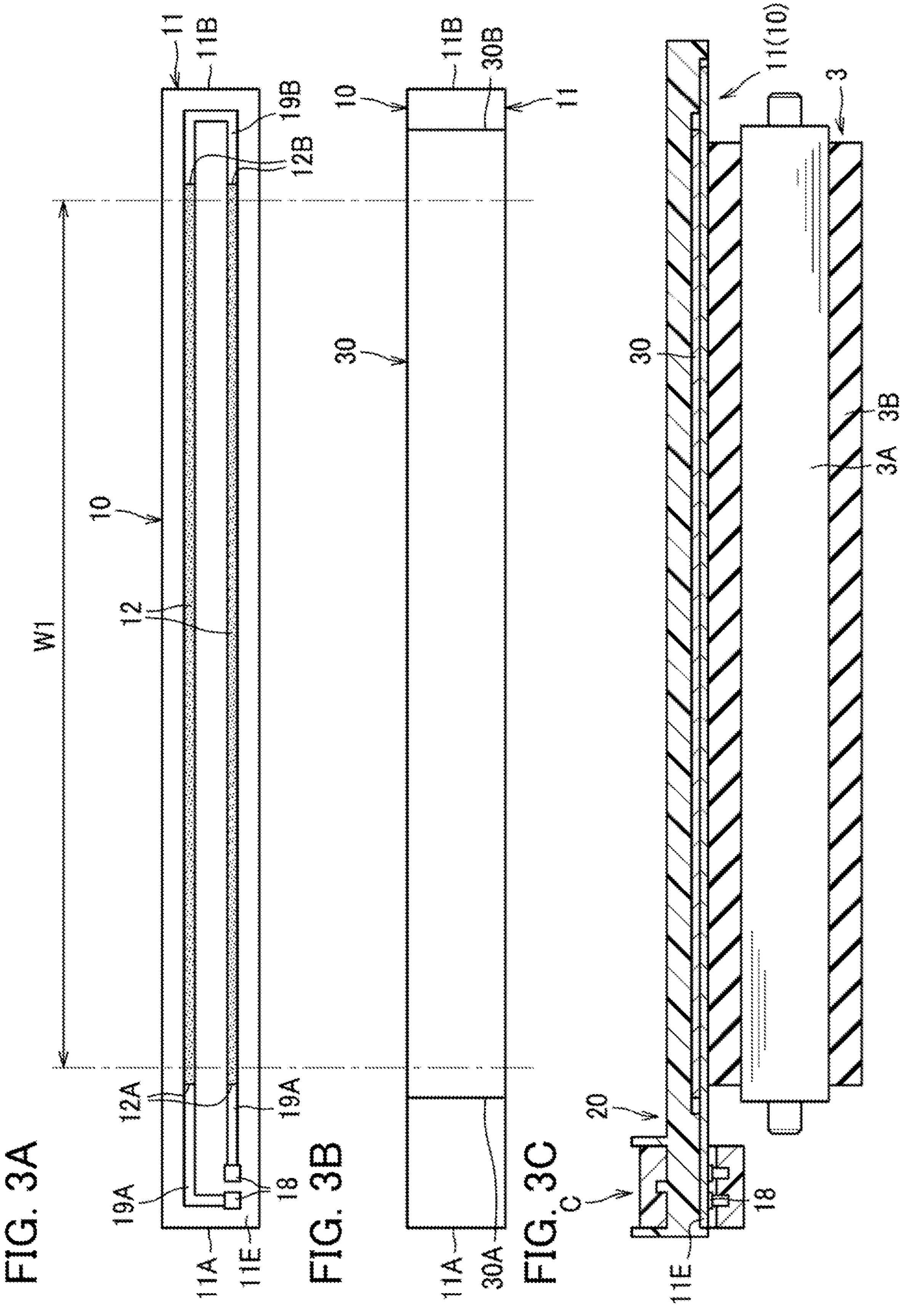
FIG. 3A is a schematic view illustrating a surface of the heater at which heating resistors are provided.
FIG. 3B is a schematic view illustrating another surface of the heater at which a heat conductive member is provided.
FIG. 3C is a cross-sectional view of the heater and components in the vicinity thereof taken along a plane extending in a longitudinal direction of the heater.

Each of the heating resistors 12 is formed on one surface of the substrate 11 by printing. As illustrated in FIG. 3A, two of the heating resistors 12 are provided in the present embodiment. However, three or more of the heating resistors 12 may be provided. The two heating resistors 12 extend parallel to each other in a longitudinal direction of the heater 10 and arranged to be spaced apart from each other in a short direction orthogonal to the longitudinal direction. In other words, the two heating resistors 12 are provided on the substrate 11 such that the heating resistors 12 are arranged in a conveying direction of the sheet S. In the following description, the conveying direction of the sheet S at the nipping region NP will also be simply referred to as "conveying direction".

Each of the heating resistors 12 has one end 12A connected to one end of a lead wire 19A. Each of the lead wires 19A has another end provided with a power feed terminal 18 configured to supply power to the corresponding heating resistor 12.

Each of the power feed terminals 18 is electrically connected to the corresponding heating resistor 12 through the corresponding lead wire 19A. The power feed terminals 18 are provided at one end portion 11E in the longitudinal direction of the substrate 11. As illustrated in FIG. 3C, a connector C configured to supply power to the heater 10 is connected to the power feed terminals 18. The connector C is attachable to and detachable from to one end portion in the longitudinal direction of the heater 10. The power feed terminals 18 are configured to receive power from the connector C when the connector C is attached to the heater 10. In FIG. 3C, the heating resistors 12, the cover 13, and the belt BL are not illustrated to facilitate understanding.

Each of the heating resistors 12 also has another end 12B opposite the one end 12A. The other ends 12B of the heating resistors 12 are connected to each other through a lead wire 19B. Note that the number of heating resistors 12 is not particularly limited. Further, the heating resistors 12 may be configured of two types of heating resistors: a first heating resistor and a second heating resistor elongated in the longitudinal direction. The first heating resistor may have a longitudinal center portion configured to generate a heat quantity greater than that generated at longitudinal end portions thereof, and the second heating resistor may have longitudinal end portions configured to generate a heat quantity greater than that generated at a longitudinal center portion thereof. The first and second heating resistors may be controlled individually in order to control distribution of heat generation with respect to the longitudinal direction.

As illustrated in FIG. 2B, the cover 13 covers the heating resistors 12. The cover 13 is made of glass, for example.

As illustrated in FIG. 2A, the holder 20 supports the heater 10, and is configured to guide the belt BL. The holder 20 is made of resin, for example.

The stay ST supports the holder 20. The stay ST is made of metal, for example.

The belt BL is an endless belt, and is made of metal or resin. The belt BL is circularly movable around the heater 10 while the belt BL is guided by the holder 20. The belt BL has an outer peripheral surface, and an inner peripheral surface. The outer peripheral surface contacts the pressure roller 3 or the sheet S as a target to be heated. The inner peripheral surface contacts the heater 10.

The heat conductive member 30 is configured to conduct heat in the longitudinal direction of the heater 10 so as to provide uniform temperature along the entire length of the heater 10 in the longitudinal direction. The heat conductive member 30 has a plate-like shape and is positioned between the heater 10 and the holder 20. The heat conductive member 30 contacts another surface of the substrate 11 which is opposite the one surface. When a sheet S is nipped between the heating unit 2 and the pressure roller 3 at the nipping region NP, the heat conductive member 30 is nipped between the heater 10 and the holder 20. The heat conductive member 30 is made of aluminum, for example.

As illustrated in FIGS. 3A and 3B, with respect to the longitudinal direction, the one end 12A and the other end 12B of each heating resistor 12 are positioned outward of a maximum width W of the sheet S applicable to the heating unit 2, and positioned inward of one end 30A and another end 30B of the heat conductive member 30, respectively. That is, the heat conductive member 30 has a length in the longitudinal direction greater than that of the heating resistors 12.

The substrate 11 has a length in the longitudinal direction greater than that of the heat conductive member 30. The one end 30A of the heat conductive member 30 is positioned inward of one end 11A of the substrate 11 in the longitudinal direction. The other end 30B of the heat conductive member 30 is positioned inward of another end 11B of the substrate 11 in the longitudinal direction.

Figure 4A:
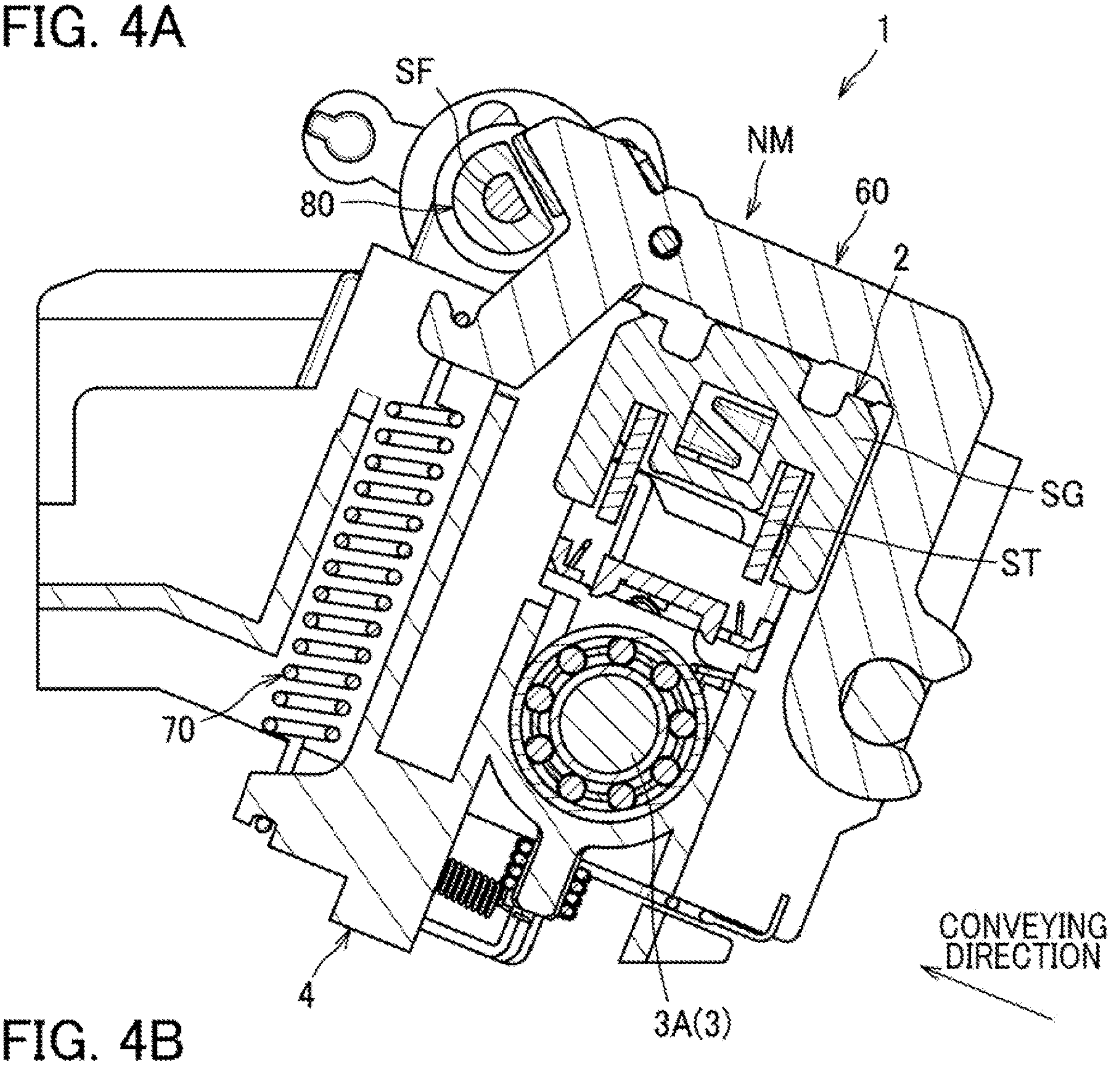
FIG. 4A is a cross-sectional view of a nipping pressure changing mechanism in a state where a nipping pressure is a first nipping pressure.

As illustrated in FIG. 4A, the fixing device 1 further includes a nipping pressure changing mechanism NM. The nipping pressure changing mechanism NM is configured to change a nipping pressure at the nipping region NP between a first nipping pressure (an example of the second nipping pressure) and a second nipping pressure (an example of the first nipping pressure) that is lower than the first nipping pressure. The nipping pressure changing mechanism NM includes a shaft SF, a pair of pressure arms 60, a pair of pressure springs 70, and a pair of cams 80. The frame 4 supports the pressure springs 70, and supports the pressure arms 60 and the cams 80 so that the pressure arms 60 and the cams 80 are pivotally movable.

One of the pressure arms 60, one of the pressure springs 70, and one of the cams 80 are provided at each end portion of the frame 4 in an axial direction of the pressure roller 3. In the following description, the axial direction of the pressure roller 3 will also be simply referred to as “axial direction”. The pressure arm 60, the pressure spring 70, and the cam 80 positioned at one end portion of the frame 4 in the axial direction are identical to those positioned at another end portion of the frame 4 in the axial direction in the present embodiment. Hence, for simplifying description, only the pressure arm 60, the pressure spring 70, and the cam 80 positioned at the one end portion of the frame 4 in the axial direction will be described.

The shaft SF extends in the axial direction. The shaft SF is made of metal, for example. The shaft SF is pivotally movably supported by the frame 4. The shaft SF has each end portion in the axial direction to which the cam 80 is fixed. The cam 80 is pivotally movable in accordance with pivotal movement of the shaft SF.

The pressure arm 60 is configured to press the heating unit 2 toward the pressure roller 3. The pressure arm 60 is pivotally movably supported by the frame 4.

The pressure spring 70 is a tension coil configured to urge the pressure arm 60 toward the pressure roller 3. The pressure spring 70 has one end connected to the pressure arm 60, and another end connected to the frame 4.

The cam 80 is configured to press the pressure arm 60 against an urging force of the pressure spring 70. Specifically, the cam 80 is pivotally movable between a first position (a position illustrated in FIG. 4A) and a second position (a position illustrated in FIG. 5A). The cam 80 is pivotally movable as a driving force is supplied from a motor (not illustrated) in the laser printer 100 through the shaft SF.

The nipping pressure at the nipping region NP is the first nipping pressure when the cam 80 is in the first position, whereas the nipping pressure at the nipping region NP is the second nipping pressure lower than the first nipping pressure when the cam 80 is in the second position.

Figure 4B:
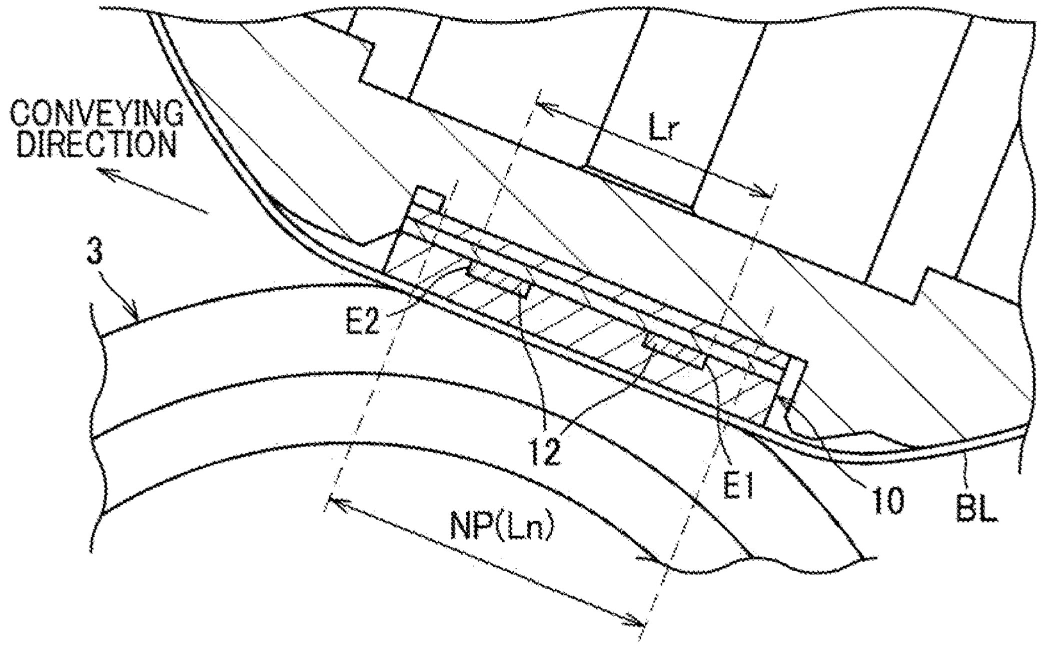
FIG. 4B is a partially enlarged cross-sectional view of the portion in the vicinity of the heater in a state where the nipping pressure is the first nipping pressure.
Figure 5A:
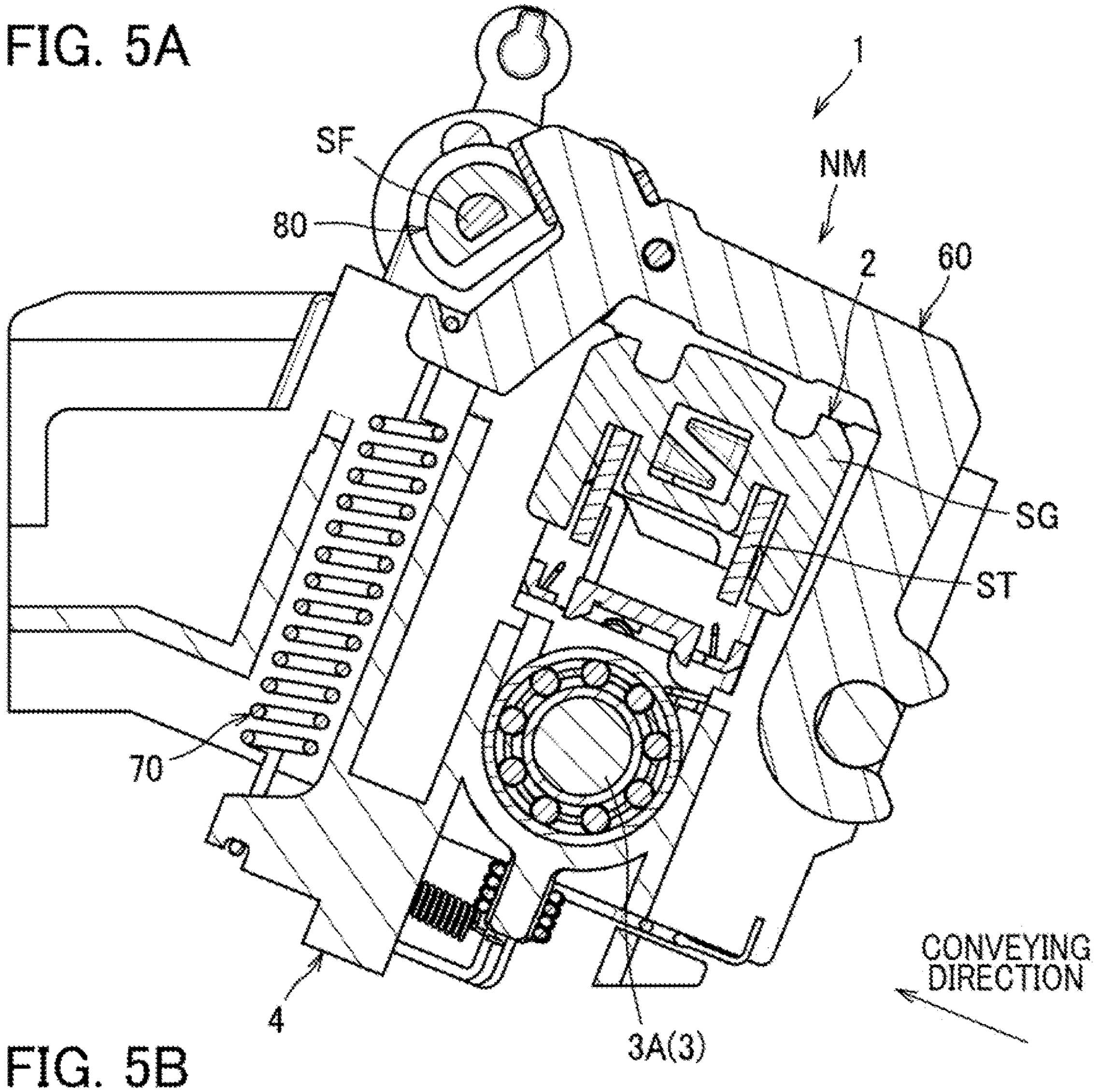
FIG. 5A is a cross-sectional view of the nipping pressure changing mechanism in a state where the nipping pressure is a second nipping pressure.
Figure 5B:
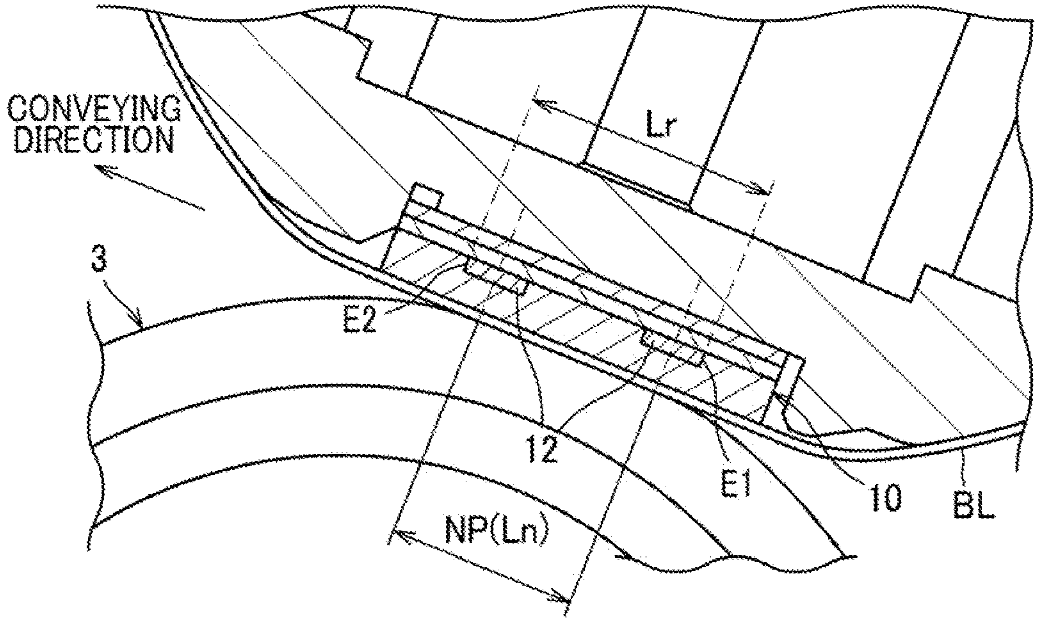
FIG. 5B is a partially enlarged cross-sectional view of the portion in the vicinity of the heater in a state where the nipping pressure is the second nipping pressure.

FIGS. 4B and 5B illustrate dimensional relationship among the components of the fixing device 1. The nipping region NP has a nipping width Ln which is a length in the conveying direction. The nipping width Ln varies depending on whether the nipping pressure at the nipping region NP is the first nipping pressure or the second nipping pressure. Also, the heating resistors 12 provide a distance Lr in the conveying direction between a most upstream end E1 and a most downstream end E2. The most upstream end E1 is a most upstream end in the conveying direction of the heating resistor 12 (an example of the first heating element) which is positioned most upstream among the heating resistors 12 in the conveying direction. The most downstream end E2 is a most downstream end in the conveying direction of another heating resistor 12 (an example of the second heating element) which is positioned most downstream among the heating resistors 12 in the conveying direction.

As illustrated in FIG. 4B, the nipping width Ln is longer than the distance Lr when the nipping pressure at the nipping region NP is the first nipping pressure. That is, the two heating resistors 12 are positioned within a range of the nipping region NP in the conveying direction.

As illustrated in FIG. 5B, the nipping width Ln is shorter than the distance Lr when the nipping pressure at the nipping region NP is the second nipping pressure. The nipping region NP is positioned within a range defined between the most upstream end E1 and the most downstream end E2 in the conveying direction.

As illustrated in FIGS. 4A and 5A, the heating unit 2 further includes a side guide SG provided at each end portion in the axial direction of the heating unit 2. Each of the side guides SG supports a corresponding end portion of the stay ST in the axial direction. Each of the side guides SG is movably supported by the frame 4. Each of the pressure arms 60 is configured to press the corresponding side guide SG toward the pressure roller 3.

The controller 500 includes a CPU, a ROM, a RAM, a non-volatile memory and the like, and is configured to perform various control operations in the laser printer 100 on the basis of a program prepared in advance. The controller 500 is configured to determine whether the rear cover 123 closes the second opening H2 or not on the basis of the information received from the cover sensor SE1.

When determining that the rear cover 123 closes the second opening H2, the controller 500 controls the motor (not illustrated) for pivotally moving the cam 80 to cause the nipping pressure changing mechanism NM to make the nipping pressure at the nipping region NP to the first nipping pressure. On the other hand, when determining that the rear cover 123 does not close the second opening H2, the controller 500 causes the nipping pressure changing mechanism NM to make the nipping pressure at the nipping region NP to the second nipping pressure.

Further, the controller 500 is configured to determine whether the nipping pressure at the nipping region NP is the first nipping pressure or the second nipping pressure when receiving a printing instruction. Specifically, in response to receiving a printing instruction, the controller 500 determines whether or not the rear cover 123 is closed on the basis of information received from the cover sensor SE1. The controller 500 determines that the nipping pressure is the first nipping pressure when determining that the rear cover 123 is closed. On the other hand, the controller 500 determines that the nipping pressure is the second nipping pressure when determining that the rear cover 123 is not closed. In the present embodiment, the cover sensor SE1 serves as a sensor configured to detect information for the controller 500 to determine whether the nipping pressure is the first nipping pressure or the second nipping pressure.

The controller 500 is configured to control the output of the heater 10 on the basis of a deviation ΔT between a target temperature Tt and a detection temperature T of the heater 10 detected by the temperature sensor SE2. The deviation ΔT is calculated by subtracting the detection temperature T from the target temperature Tt, for example. The controller 500 is configured to set the output of the heater 10 to a greater value as the deviation ΔT is greater.

The controller 500 is configured to control a duty cycle of power supply to the heater 10 to thereby control the output of the heater 10. When determining that the nipping pressure is the first nipping pressure, the controller 500 determines the duty cycle on the basis of a first table (an example of the second table) illustrated in FIG. 7A and the deviation ΔT. A first duty upper limit (an example of the second duty upper limit) that is the upper limit for the duty cycle in the first table, is 100%.

When determining that the nipping pressure is the second nipping pressure, the controller 500 determines the duty cycle on the basis of a second table (an example of the first table) illustrated in FIG. 7B and the deviation ΔT. A second duty upper limit (an example of the first duty upper limit) that is the upper limit for the duty cycle in the second table, is 57%. Each of the first table in FIG. 7A and the second table in FIG. 7B is a table correlating the deviation ΔT with the duty cycle. In the present embodiment, both the first table and the second table are stored in the memory 600.

That is, when determining that the nipping pressure is the second nipping pressure, the controller 500 controls the duty cycle within a range that does not exceed the second duty upper limit (57%) that is smaller than the first duty upper limit (100%). Thus, when determining that the nipping pressure is the second nipping pressure, the controller 500 controls the output of the heater 10 within a range that does not exceed a second output upper limit (an example of the first output upper limit) that is the upper limit for the output of the heater 10 when the nipping pressure is the second nipping pressure. The second output upper limit is smaller than a first output upper limit (an example of the second output upper limit) that is the upper limit for the output of the heater 10 when the nipping pressure is determined to be the first nipping pressure.

Next, operations performed by the controller 500 will be described in detail.

Figure 6:
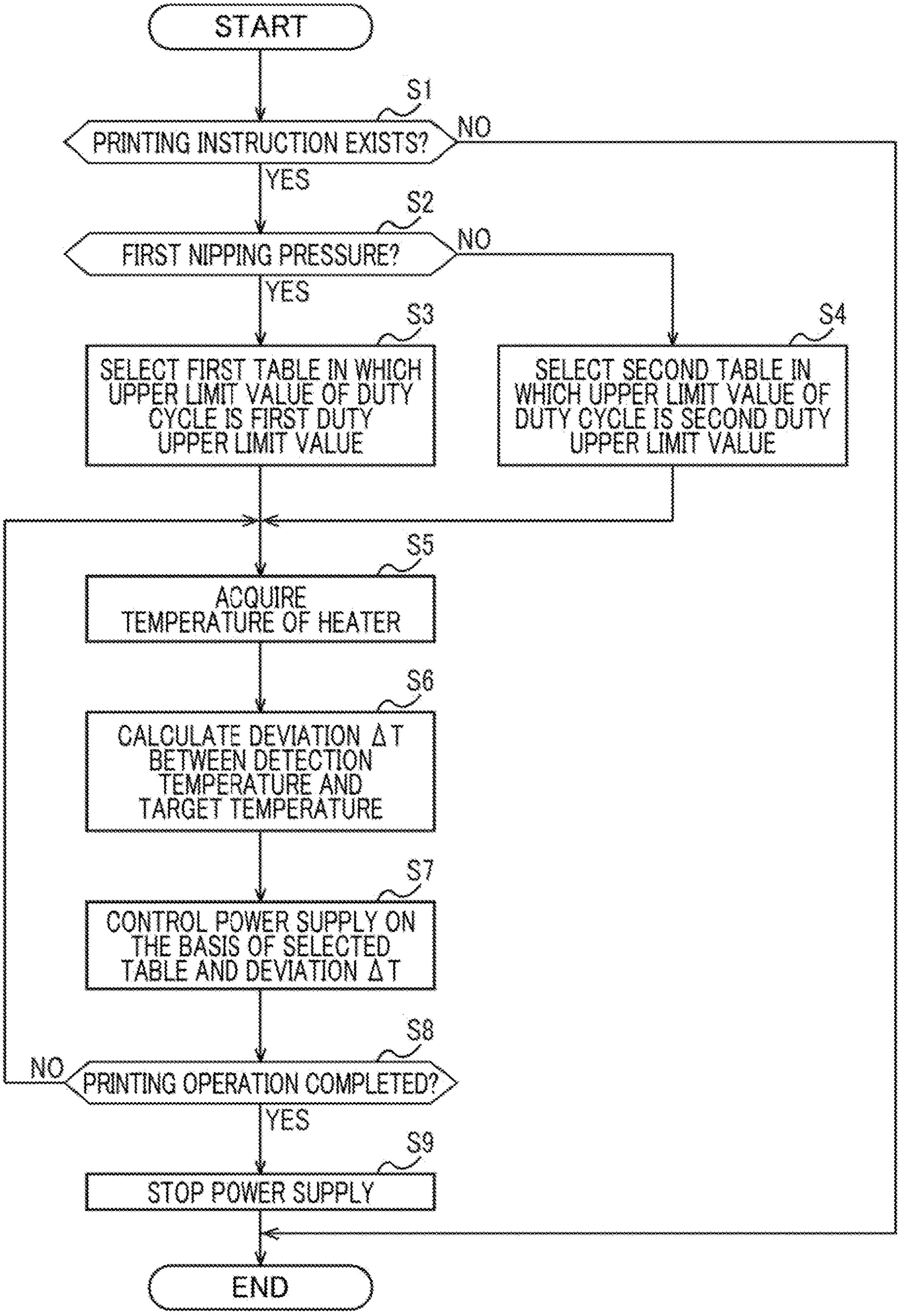
FIG. 6 is a flowchart illustrating steps executed by a controller.

As illustrated in the flowchart of FIG. 6, in S1 the controller 500 determines whether or not a printing instruction exists. When determining in S1 that a printing instruction does not exist (S1: NO), the controller 500 ends this routine.

When determining in S1 that a printing instruction exists (S1: YES), in S2 the controller 500 determines, on the basis of information received from the cover sensor SE1, whether or not the nipping pressure is the first nipping pressure. The process in S2 is an example of the determining. When determining in S2 that the nipping pressure is the first nipping pressure (S2: YES), in S3 the controller 500 selects the first table illustrated in FIG. 7A. The process in S3 is an example of the selecting the second table.

When determining in S2 that the nipping pressure is not the first nipping pressure, i.e., when determining that the nipping pressure is the second nipping pressure (S2: NO), in S4 the controller 500 selects the second table illustrated in FIG. 7B. After performing the process in S3 or S4, in S5 the controller 500 acquires the temperature of the heater 10 from the temperature sensor SE2. The process in S4 is an example of the selecting the first table.

After the process of S5, in S6 the controller 500 calculates the deviation ΔT between the target temperature Tt and the detection temperature T detected by the temperature sensor SE2. Subsequently, in S7 the controller 500 sets the duty cycle on the basis of the first or second table selected in the process of S3 or S4 and the calculated deviation ΔT, and controls power supply to the heater 10 using the set duty cycle.

After the process of S7, in S8 the controller 500 determines whether or not a printing operation based on the printing instruction has been completed. When determining in S8 that the printing operation has not yet been completed (S8: NO), the controller 500 returns to the process of S5. The processes performed from the determination of S2: NO to S8 is an example of the controlling.

When determining in S8 that the printing operation has been completed (S8: YES), in S9 the controller 500 stops power supply to the heater 10, and ends the process of FIG. 6. The processes in S1 to S9 are an example of the control process.

A specific example of the operations performed by the controller 500 will next be described.

When a user opens the rear cover 123 illustrated in FIG. 1 to perform a straight printing, the controller 500 controls the nipping pressure changing mechanism NM illustrated in FIG. 4A on the basis of information received from the cover sensor SE1 to change the nipping pressure from the first nipping pressure to the second nipping pressure.

When receiving a printing instruction while the nipping pressure is the second nipping pressure, the controller 500 performs processes in the order of S1: YES→S2: NO→S4 to S7. As a result, the output of the heater 10 is limited to a value equal to or less than the second output upper limit (57%).

As illustrated in FIG. 5B, since the nipping width Ln when the nipping pressure is the second nipping pressure is small, the quantity of heat transmitted from the heater 10 to the pressure roller 3 through the belt BL decreases and heat is likely to accumulate in the heater 10. In particular, in a configuration according to the present embodiment in which a part of each heating resistor 12 is positioned outward of the range of the nipping region NP, heat is more likely to accumulate in the heater 10. However, as described above, when the nipping pressure is the second nipping pressure, the output of the heater 10 is restricted to be equal to or less than the second output upper limit, thereby restraining heat from accumulating in the heater 10.

According to the present embodiment, the following advantages can be obtained.

When the nipping pressure is low, the output of the heater 10 is restricted to be equal to or less than the second output upper limit. Accordingly, excessive rise in the temperature of the heater 10 which is caused by supplying power to the heater 10 when the nipping pressure is low can be restrained.

When the nipping pressure is low, power supply with a large duty cycle is not performed, thereby restricting the output of the heater 10 to be equal to or less than the second output upper limit when the nipping pressure is low.

<Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Although the duty cycle is set on the basis of the deviation ΔT in the above embodiment, the present disclosure need not be limited to this method. In this modification, the duty cycle is set on the basis of a manipulated variable U using the sum of a proportional term proportional to the deviation ΔT and a derivative term proportional to a derivative value of the deviation ΔT. Specifically, the controller 500 calculates the manipulated variable U according to the following expression (1).

$$U_n = K_p \Delta T_n + K_d D_n$$

$$D_n = (T_n - T_{n-1})/ts \tag{1}$$

in which ts is control cycle (time).

In the above expression, $K_p$ is a proportional gain as a preset fixed value; $K_d$ is a derivative gain, which is selected from either K1 or K2 depending on the nipping pressure as will be described later; D is a derivative value of the deviation ΔT; and n added to each variable indicates that the variable is a current value, while n−1 indicates that the variable is a previous value.

Further, in the above expression, $K_p \Delta T_n$ is a proportional term, and $K_d D_n$ is a derivative term. The positive and negative of the proportional term and the derivative term is set so as to cancel each other in the process of the detection temperature T rising toward the target temperature Tt. In the following example, it is assumed that $K_p$ is positive, $K_d$ is negative, and $\Delta T_n$ and $D_n$ become positive in the process of the detection temperature T rising toward the target temperature Tt.

The positive and negative between $K_p$ and $K_d$ may be reversed. That is, $K_p$ may be negative, and $K_d$ may be positive. Further, when $\Delta T_n$ and $D_n$ are set to become negative in the process of the detection temperature T rising toward the target temperature Tt (for example, in a case in which $\Delta T = T_{n-1} - T_n$), the positive and negative between $K_p$ and $K_d$ may be reversed.

The controller 500 is configured to set the duty cycle of power supply to the heater 10 to a greater value as the absolute value of the calculated manipulated variable U is greater. When the nipping pressure is the second nipping pressure, the controller 500 sets the coefficient $K_d$ of the derivative term to such a value that the absolute value of the calculated manipulated variable U is smaller than when the nipping pressure is the first nipping pressure.

Specifically, when determining that the nipping pressure is the first nipping pressure, the controller 500 sets the coefficient $K_d$ to −K1. On the other hand, when determining that the nipping pressure is the second nipping pressure, the controller 500 sets the coefficient $K_d$ to −K2. The values of K1 and K2 are positive, and K1<K2 is satisfied.

When determining that the nipping pressure is the first nipping pressure, the controller 500 determines the duty cycle on the basis of a third table (an example of the fourth table) illustrated in FIG. 9A and the manipulated variable U. A first duty upper limit, which is the upper limit for the duty cycle in the third table, is 100%.

When determining that the nipping pressure is the second nipping pressure, the controller 500 determines the duty cycle on the basis of a fourth table (an example of the third table) illustrated in FIG. 9B and the manipulated variable U. A second duty upper limit, which is the upper limit for the duty cycle in the fourth table, is 57%. Each of the third table in FIG. 9A and the fourth table in FIG. 9B is a table correlating the manipulated variable U with the duty cycle.

In this modification, both the third table and the fourth table are stored in the memory 600 instead of the first table and the second table.

Figure 8:
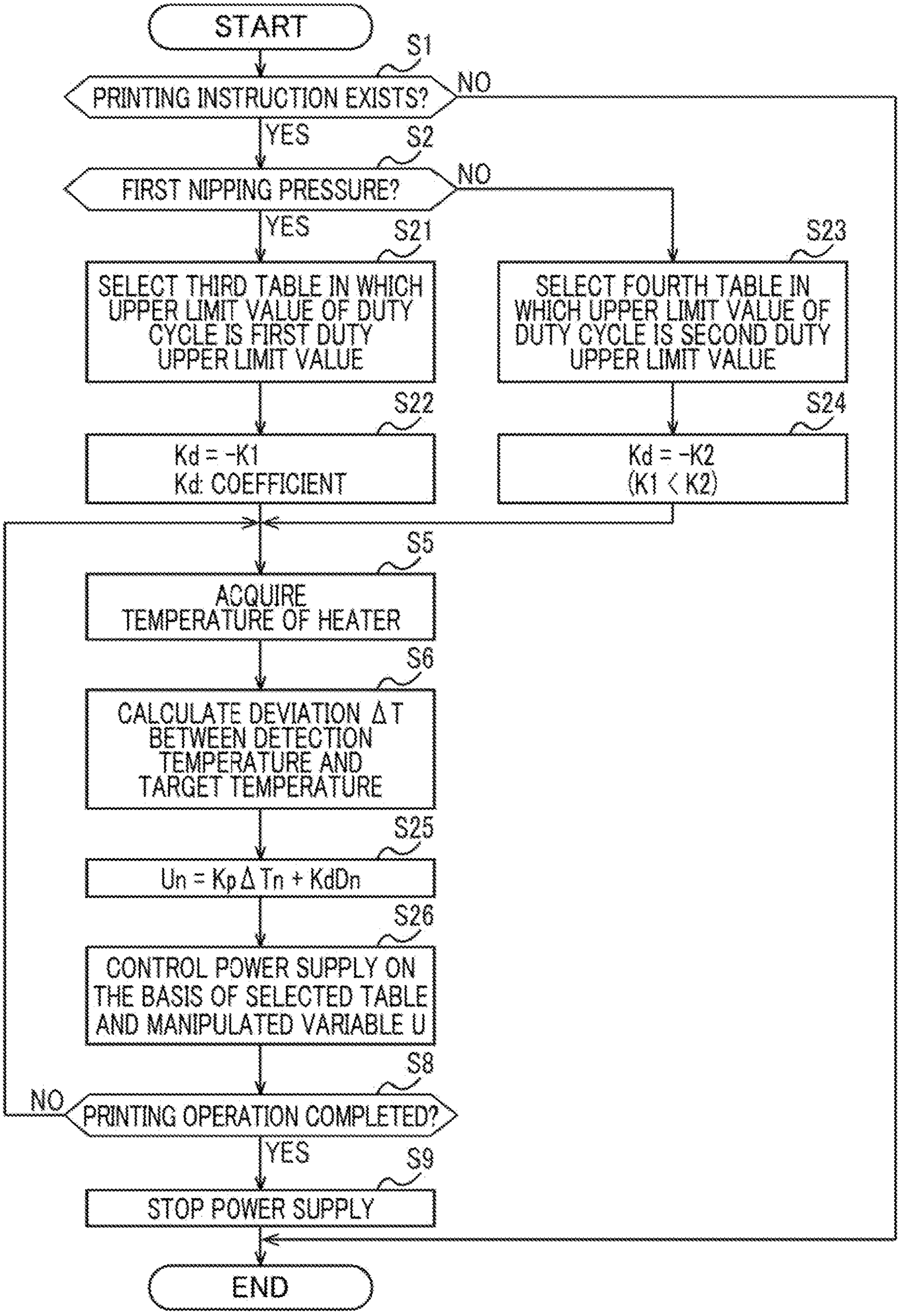
FIG. 8 is a flowchart illustrating steps executed by a controller.

The controller 500 according to this modification is configured to execute processes illustrated in the flowchart of FIG. 8. Since only a part of the flowchart illustrated in FIG. 8 differs from the flowchart of FIG. 6, processes which are the same as those in the flowchart of FIG. 6 are designated with the same step numbers to omit the duplicating description.

As illustrated in the flowchart of FIG. 8, when determining in S2 that the nipping pressure is the first nipping pressure (S2: YES), in S21 the controller 500 selects the third table illustrated in FIG. 9A. After the process of S21, in S22 the controller 500 sets the coefficient $K_d$ of the derivative term to −K1. The process in S21 is an example of the selecting the fourth table.

When determining in S2 that the nipping pressure is not the first nipping pressure (S2: NO), in S23 the controller 500 selects the fourth table illustrated in FIG. 9B. After the process of S23, in S24 the controller 500 sets the coefficient $K_d$ of the derivative term to −K2. That is, when the nipping pressure is the second nipping pressure, the controller 500 sets the absolute value of the coefficient $K_d$ of the derivative term to a value greater than that when the nipping pressure is the first nipping pressure. The process in S23 is an example of the selecting the third table.

After the process of S22 or S24, the controller 500 executes the processes of S5 and S6. Subsequently, in S25 the controller 500 calculates the manipulated variable U according to expression (1). The process in S25 is an example of the calculating. After the process of S25, in S26 the controller 500 sets the duty cycle on the basis of the third of fourth table selected in the process of S21 or S23 and the calculated manipulated variable U, and controls power supply to the heater 10 using the set duty cycle. Subsequently, the controller 500 executes the processes of S8 and S9, and then ends the routine of FIG. 8.

Also in this modification, the output of the heater 10 is restricted to a value equal to or less than the second output upper limit when the nipping pressure is low, thereby suppressing excessive rise in the temperature of the heater 10 which is caused by supplying power to the heater 10 when the nipping pressure is low.

Although the pressure roller 3 serves an example of the rotary body in the embodiment described above, the present disclosure need not be limited to this configuration. When the components for applying pressure includes an endless pressure belt and a pad that nips the pressure belt in cooperation with the heating unit, the pressure belt may be employed as the rotary body.

The nipping pressure changing mechanism may have a configuration different from that in the above embodiment. For example, the nipping pressure changing mechanism may be configured to change the nipping pressure among three or more stages. Further, the nipping pressure changing mechanism may include a link mechanism that causes the cams 80 to be pivotally moved between the first position and the second position in conjunction with opening and closing movement of the rear cover 123 that opens and closes the second opening H2. In this case, the cams 80 are caused to be pivotally moved to the first position through the link mechanism when the rear cover 123 is moved to be closed, while the cams 80 are caused to be pivotally moved to the second position through the link mechanism when the rear cover 123 is moved to be opened.

In the above embodiment, the cover sensor SE1 serves as a sensor configured to detect information for determining whether the nipping pressure is the first nipping pressure or the second nipping pressure. However, other types of sensors are available. For example, a sensor configured to detect a position of the heating unit 2, or a sensor configured to detect attachment and detachment of the process cartridge 150 relative to the main casing 120 may be employed. In a case where the sensor configured to detect attachment and detachment of the process cartridge 150 relative to the main casing 120 is employed, the nipping pressure changing mechanism may cause the cam 80 to be pivotally moved between the first position and the second position in conjunction with the attachment and detachment of the process cartridge 150 relative to the main casing 120.

Although the present disclosure is applied to the laser printer 100 in the above embodiment, the present disclosure may be applied to other types of image forming apparatuses such as a copying machine or a multifunction peripheral.

The parts and components described in the above embodiment and modifications may be combined where appropriate.

What is claimed is:

1. An image forming apparatus comprising:
- a heater comprising:
  - a substrate; and
  - one or more heating elements;
- an endless belt circularly movable around the heater;
- a rotary body configured to nip, in cooperation with the heater, the belt therebetween to form a nipping region;
- a nipping pressure changing mechanism configured to change a nipping pressure at the nipping region between:
  - a first nipping pressure; and
  - a second nipping pressure that is higher than the first nipping pressure; and
- a controller configured to perform a control process to control output of the heater, the control process comprising:
  - determining whether the nipping pressure is the first nipping pressure or the second nipping pressure; and
  - controlling, when determining that the nipping pressure is the first nipping pressure, the output of the heater within a range that does not exceed a first output upper limit that is an upper limit for the output of the heater when the nipping pressure is the first nipping pressure, the first output upper limit being smaller than a second output upper limit that is an upper limit for the output of the heater when the nipping pressure is the second nipping pressure.

2. The image forming apparatus according to claim 1, further comprising a temperature sensor configured to detect a temperature of the heater,
- wherein, in the control process, the output of the heater is set to a greater value as a deviation between a detection temperature and a target temperature is greater, the detection temperature being the temperature of the heater detected by the temperature sensor.

3. The image forming apparatus according to claim 2,
- wherein, in the control process, the output of the heater is controlled by controlling a duty cycle of power supply to the heater,
- the image forming apparatus further comprising a memory storing therein a plurality of tables that correlates the deviation with the duty cycle, the tables comprising:

a first table in which an upper limit for the duty cycle is a first duty upper limit; and a second table in which the upper limit for the duty cycle is a second duty upper limit that is greater than the first duty upper limit, wherein the first duty upper limit corresponds to the first output upper limit, and the second duty upper limit corresponds to the second output upper limit, and wherein the control process further comprises:

selecting, when determining that the nipping pressure is the first nipping pressure, the first table to determine the duty cycle on the basis of the deviation; and selecting, when determining that the nipping pressure is the second nipping pressure, the second table to determine the duty cycle on the basis of the deviation.

4. The image forming apparatus according to claim 3, wherein the second duty upper limit is 100%.

5. The image forming apparatus according to claim 1, wherein, in the controlling, the output of the heater is controlled by controlling a duty cycle of power supply to the heater within a range that does not exceed a first duty upper limit that is an upper limit for the duty cycle when the nipping pressure is the first nipping pressure, the first duty upper limit being smaller than a second duty upper limit that is an upper limit for the duty cycle when the nipping pressure is the second nipping pressure, and wherein the first duty upper limit corresponds to the first output upper limit, and the second duty upper limit corresponds to the second output upper limit.

6. The image forming apparatus according to claim 1, further comprising a temperature sensor configured to detect a temperature of the heater, wherein the control process further comprises:

calculating a manipulated variable using a sum of:

a proportional term proportional to a deviation between a detection temperature and a target temperature, the detection temperature being the temperature of the heater detected by the temperature sensor; and a derivative term proportional to a derivative value of the deviation, the derivative term having a coefficient, wherein, in the control process, the output of the heater is controlled by controlling a duty cycle of power supply to the heater, the duty cycle of power supply to the heater being set to a greater value as an absolute value of the calculated manipulated variable is greater, and wherein, in the controlling, the coefficient of the derivative term is set to such a value that the absolute value of the calculated manipulated variable is smaller than when the nipping pressure is the second nipping pressure.

7. The image forming apparatus according to claim 6, further comprising a memory storing therein a plurality of tables that correlates the manipulated variable with the duty cycle, the tables comprising:

a third table in which an upper limit for the duty cycle is a first duty upper limit; and a fourth table in which the upper limit for the duty cycle is a second duty upper limit that is greater than the first duty upper limit, wherein the control process further comprises:

selecting, when determining that the nipping pressure is the first nipping pressure, the third table to determine the duty cycle on the basis of the absolute value of the manipulated variable; and selecting, when determining that the nipping pressure is the second nipping pressure, the fourth table to determine the duty cycle on the basis of the absolute value of the manipulated variable.

8. The image forming apparatus according to claim 7, wherein the second duty upper limit is 100%.

9. The image forming apparatus according to claim 1, wherein the determining is performed in response to receiving a printing instruction.

10. The image forming apparatus according to claim 1, wherein the one or more heating elements comprise a plurality of heating elements provided on the substrate and arranged in a conveying direction of a sheet, the heating elements comprising:

a first heating element positioned most upstream among the heating elements in the conveying direction, the first heating element having a most upstream end in the conveying direction; and a second heating element positioned most downstream among the heating elements in the conveying direction, the second heating element having a most downstream end in the conveying direction, and wherein, when the nipping pressure is the first nipping pressure, the nipping region has a length in the conveying direction that is shorter than a distance in the conveying direction between the most upstream end and the most downstream end.

11. The image forming apparatus according to claim 10, wherein, when the nipping pressure is the second nipping pressure, the length in the conveying direction of the nipping region is longer than the distance in the conveying direction between the most upstream end and the most downstream end.

12. The image forming apparatus according to claim 1, further comprising a sensor configured to detect information for the controller to perform the determining.

13. The image forming apparatus according to claim 12, further comprising:

a main casing having an opening; and a cover configured to open and close the opening, wherein the sensor is configured to detect whether the cover closes the opening.

14. The image forming apparatus according to claim 13, wherein the controller is configured to cause the nipping pressure changing mechanism to make the nipping pressure to the second nipping pressure when determining that the cover closes the opening on the basis of the information from the sensor, and to cause the nipping pressure changing mechanism to make the nipping pressure to the first nipping pressure when determining that the cover does not close the opening on the basis of the information from the sensor.

15. An image forming apparatus comprising:

a heater comprising:

a substrate; and a plurality of heating elements provided on the substrate and arranged in a conveying direction of a sheet, the heating elements comprising:

a first heating element positioned most upstream among the heating elements in the conveying direction, the first heating element having a most upstream end in the conveying direction; and a second heating element positioned most downstream among the heating elements in the conveying direction, the second heating element having a most downstream end in the conveying direction;

an endless belt circularly movable around the heater;

a rotary body configured to nip, in cooperation with the heater, the belt therebetween to form a nipping region; and a controller, wherein the nipping region has a length in the conveying direction that can be changed between:

a first length that is shorter than a distance in the conveying direction between the most upstream end and the most downstream end; and a second length that is longer than the distance in the conveying direction between the most upstream end and the most downstream end, and wherein the controller is configured to perform a control process to control output of the heater, the control process comprising:

controlling, when the length in the conveying direction of the nipping region is the first length, the output of the heater within a range that does not exceed a first output upper limit that is an upper limit for the output of the heater when the length in the conveying direction of the nipping region is the first length, the first output upper limit being smaller than a second output upper limit that is an upper limit for the output of the heater when the length in the conveying direction of the nipping region is the second length.

* * * * *